C. WOLKE.
MACHINE FOR LINKING SAUSAGES AND THE LIKE.
APPLICATION FILED SEPT. 11, 1916.

1,245,652.

Patented Nov. 6, 1917.
6 SHEETS—SHEET 1.

Fig. 1.

Attest:
Charles A. Becker.

Inventor.
Conrad Wolke,
by Ralph Rauch
his Attorney.

UNITED STATES PATENT OFFICE.

CONRAD WOLKE, OF ST. LOUIS, MISSOURI.

MACHINE FOR LINKING SAUSAGES AND THE LIKE.

1,245,652.  Specification of Letters Patent.  Patented Nov. 6, 1917.

Application filed September 11, 1916. Serial No. 119,458.

*To all whom it may concern:*

Be it known that I, CONRAD WOLKE, a citizen of the United States, residing at the city of St. Louis, State of Missouri, have invented a certain new and useful Machine for Linking Sausages and the like, of which the following is a specification, reference being had to the accompanying drawings, forming a part thereof.

This invention relates to a certain new and useful machine for linking sausages and the like.

In the production of sausages and similar products, the meat or other sausage-material is first placed in an elongated tubular casing of intestinal-gut or the like, the casing is then suitably closed at its ends, after which the casing is torsionally twisted upon itself at points throughout its length spaced apart predetermined approximately equal distances to divide or link the casing into a plurality of connected sausages each correspondingly of a predetermined approximately equal length. Such twisting or linking has heretofore, so far as I am aware, been generally in actual practice manually accomplished, the labor, time, and expense involved being more or less considerable and the cost of production of the finished products being correspondingly relatively high.

The principal object of my present invention is to provide a machine for automatically linking or twisting such a sausage-casing into a plurality of connected sausages having each approximately the same length. By my new machine, I obviate manual handling of the sausage-casing in such operations and to a large degree lessen the time and labor involved in so linking the sausage-casing and, also correspondingly, reduce the cost of production.

With the above and other objects in view, my present invention resides in certain novel features of form, construction, arrangement, and combination of parts, all as will hereinafter be described and afterward pointed out in the claims.

In the accompanying drawings, in which my invention is illustrated in preferred form,—

Referring to the said drawings, in which like reference characters refer to like parts throughout the several views, the working-parts of the machine are preferably mounted upon a suitable table, bench, or the like 1 having suitable legs 2 adapted to rest upon a floor or other place of support.

Rigidly mounted upon, and upstanding from, table 1 is a central or main standard 3 having an aperture, as at 4, disposed longitudinally of the machine. Fixed to and upon the upper end of standard 3, is a split collar or other bearing 5, journaled in which for rotation is a relatively short open-ended tubular member or barrel 6 also disposed longitudinally of the machine. Barrel 6 may be of any suitable interior diameter to freely accommodate therethrough the particular sausage-casings being worked upon or linked. In the present machine, this barrel 6 has a length of approximately four inches; but it will be understood that the same may be of greater or less length, as may be suitable.

Figure 1:
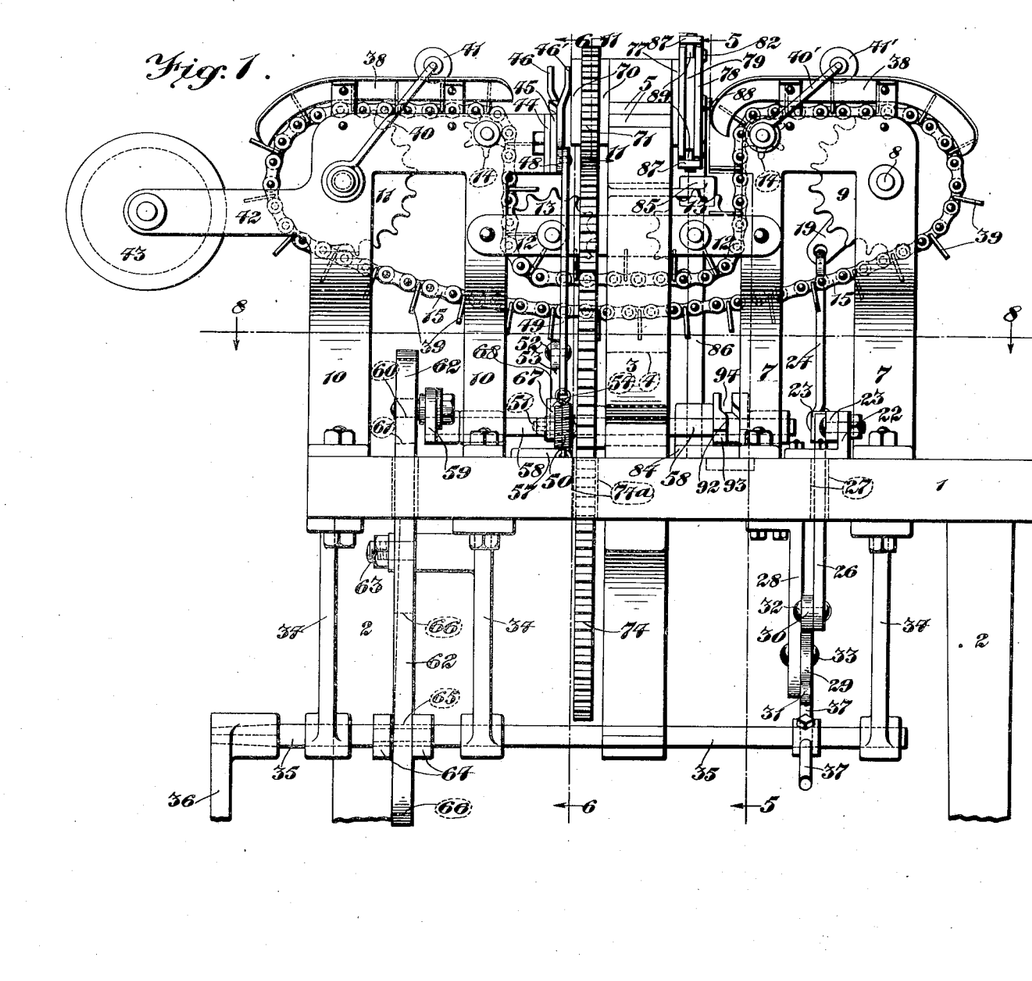
Figure 1 is a side elevational view of a sausage-linking machine embodying my invention.
Figure 2:
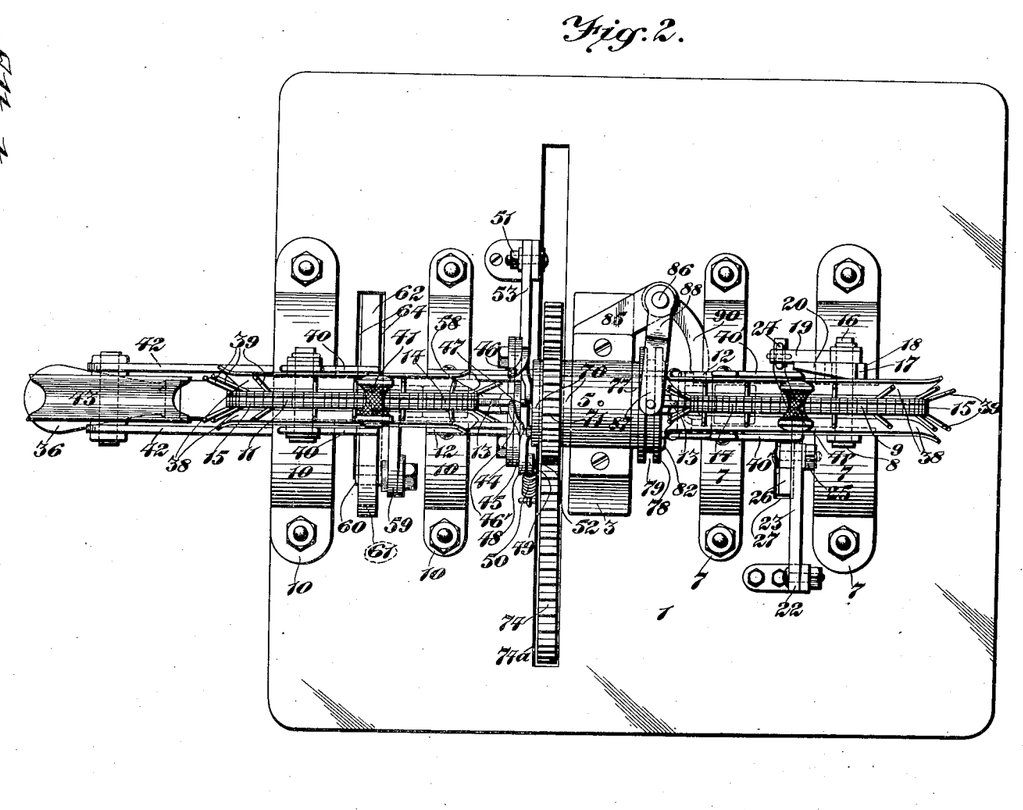
Fig. 2 is a top plan view of the machine.

Also rigidly mounted upon, and upstanding from, table 1 to the rear side of main standard 3 and in alinement approximately with the bore of barrel 6, is a spaced pair of suitable standards 7 also disposed longitudinally of the machine. Journaled for rotation upon the standards 7 and located preferably adjacent to the rear end of the table, as seen in Figs. 1 and 2, is a small shaft or axle-bar 8. Fixed upon this shaft or bar 8 and disposed between the standards 7, is a conveyer driving-pulley or sprocket-wheel 9. Correspondingly rigidly mounted upon, and upstanding from, the table 1 to the front side of main standard 3, is a similar spaced pair of standards 10 likewise disposed longitudinally of the machine and alining with the rear standards 7; and similarly journaled for rotation upon, and between, the standards 10, but located preferably adjacent to the front end of the table, is a driven pulley or sprocket-wheel 11. Fixed to the standards 7 and 10 and extending through the aperture 4 of standard 3, as seen in Fig. 1, is a pair of spaced bearing-pieces 12—12, journaled upon which for rotation therebetween and preferably located adjacent opposite sides of main standard 3, are idler pulleys or sprocket-wheels 13—13. And also journaled for rotation upon the standards 7 and 10 and located adjacent the opposite ends of barrel 6, are additional idler pulleys or sprocket-wheels 14—14. Traveling longitudinally of the machine upon the several pulleys or sprocket-wheels 9, 11, 13, and 14 and between the spaced standards 7 and 10, is a suitable endless conveyer-belt 15 shown here as a sprocket-chain meshing, as seen especially in Fig. 1, with the several sprocket-wheels mentioned. As seen particularly in Fig. 1, sprocket-wheels 9, 11, and 14 are so journaled upon the standards 7 and 10 that the belt or chain 15, which is adapted and designed to convey or carry through the machine the sausage-casing being worked upon or linked, for portions of its travel to each side of central standard 3 is caused to travel on a substantially horizontal plane approximately in alinement with, or a little below, the center line or axis of the barrel 6.

Figure 4:
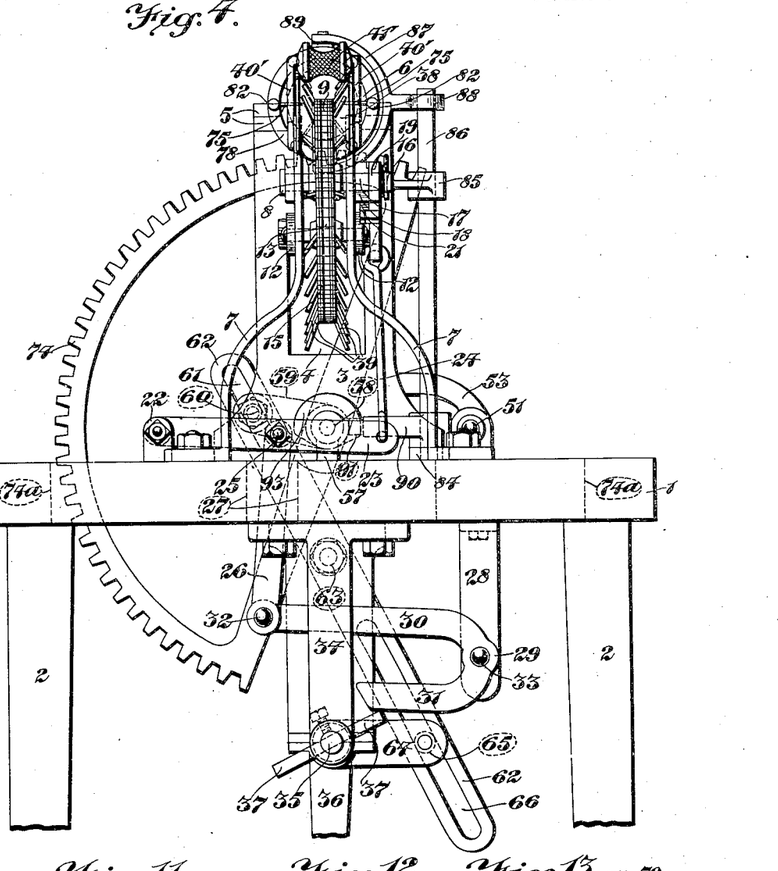
Fig. 4 is a rear end elevational view of the machine.
Figure 10:
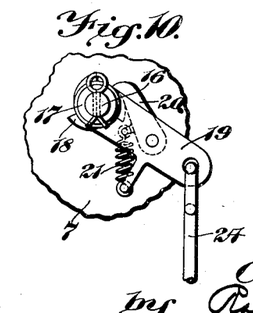
Fig. 10 is a fragmentary view illustrating a portion of the conveyer or chain actuating-means of the machine.
Figures 11, 12:
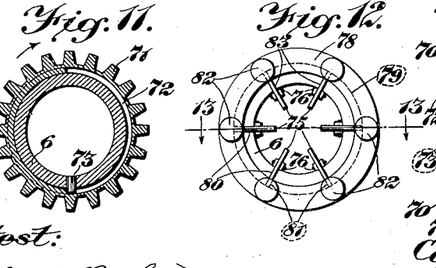
Fig. 11 is an enlarged detail sectional view through the sausage-barrel and its rotating gear, taken approximately on the line 11—11, Fig. 1.
Fig. 12 is an enlarged rear elevational view of the sausage-barrel.

Fixed upon a longitudinal extension 16 of shaft or bar 8, is a ratchet-wheel 17 having, in the machine here shown, three circumferentially equidistant teeth 18. Pivoted to loosely swing upon shaft-extension 16, is a preferably wieghted arm 19, pivoted upon which at one end is a pawl 20 yieldingly held in engagement with the ratchet-wheel 17 by a spring 21, as illustrated particularly in Fig. 10. Pivotally fastened or fulcrumed at one end, as at 22, upon table 1 and extending transversely of the machine, is a bar or lever 23. Extending between, and pivotally fastened at its ends to, the free ends of lever 23 and arm 19, is a connecting-rod or link 24. Intermediate its ends, as at 25, lever 23 has pivotally fastened to it one end of a second link 26, which projects downwardly through and works in a suitable slot or aperture 27 in table 1. Fixed at one end to, and depending from, the under face of table 1, is a rigid bracket 28. Also positioned below the table 1 transversely of the machine, is a member 29 approximately U-shaped in side elevation, as seen in Fig. 4, member 29 having a long leg 30 and a short leg 31 and being pivotally fastened, as at 32, at the end of its long leg 30 to the lower or free end of link 26, and, as at 33, at its bight to the bracket 28, to rock vertically relatively to the machine.

Extending longitudinally of the machine and journaled for rotation in suitable bearings or hangers 34 fixed upon, and depending from, the under side of the table 1, is an operating shaft 35 provided preferably at its forward end with a crank-handle or other rotarily actuating member 36. Fixed upon the shaft 35 adjacent to its rear end and in coöperative position relatively to rockable member 29, is a pair of oppositely disposed rocker-pins 37—37 adapted, on the rotation of shaft 35, to alternately engage with short leg 31 of member 29. On the rotation of shaft 35, as each respective pin 37 is brought into engagement with the short leg 31 of member 29, member 29 will be rocked upwardly, shaft 8 and its conjoined sprocket-wheel 9 will, through link 26, lever 23, link 24, arm 19, pawl 20, and ratchet-wheel 17, be rotarily actuated for a limited distance, and chain or belt 15 will be driven rearwardly a predetermined distance, the arm 19 and said described parts falling back by gravity to lowermost position as soon as the respective pin 37 is carried out of engagement with said member 31 and pawl 20 thereby carried down to engage with the next succeeding tooth 18 of the ratchet-wheel 17 to again, as described, drive the chain 15 as the other pin 37 is brought into engagement with the member 29. Thus, on each complete revolution of the shaft 35, the chain 15 and the sausage-casing being conveyed or carried thereby will be intermittently or step-by-step and at predetermined equal intervals apart, driven or caused to travel rearwardly two equal and predetermined distances—in this present machine, each such distance being about or approximately four inches.

Fixed longitudinally to the pairs of standards 7 and 10 are similarly spaced pairs of oppositely disposed obliquely upwardly and outwardly projecting elongated strips 38—38 providing retaining-guards or somewhat V-shaped open-bottom track-ways for the sausage-casing being conveyed by the belt or chain 15, which latter forms substantially a movable bottom for the soformed track-ways. Fixed to the chain or belt 15 and adapted to travel within said track-ways on the conveying-movement of the chain 15, are series of pairs of oppositely disposed sausage-casing gripping fingers, prongs, or the like 39 adapted to assist the belt or chain 15 in positively carrying or conveying through the machine the sausage-casing being worked upon or linked.

Suitably pivoted at its legs to the standards 10 and swingably straddling the front track-way 38, is a substantially U-shaped member 40, journaled upon the bight of which is a double-coned preferably weighted roller 41. Similarly mounted upon the standards 7 is a like member 40' having likewise journaled thereupon a like roller 41'. These rollers 41 and 41', which are normally disposed transversely upon the said track-ways at suitable distances from the forward and rear ends, respectively, of the barrel 6, as seen particularly in Fig. 1, are adapted to rotatably bear upon the sausage-casing being worked upon as it is being carried along the track-ways 38 by the belt or chain 15, and, being, as stated, suitably located to the front and rear of the barrel 6, to engage with the sausage-casing being worked at two spaced apart points to firmly hold the said casing from any twisting or torsional movement at said points of engagement while the said casing, at other points intermediate said points of roller-engagement therewith and at and within the barrel 6, is being torsionally twisted or linked, as hereinafter more fully appears.

Projecting forwardly from front standards 10 are spaced arms 42—42, suitably journaled for rotation between which is a grooved idler-roller 43 adapted to facilitate the lengthwise feeding or movement of the sausage-casing being worked into the front track-way 38 and upon the chain or belt 15.

Adjacent barrel 6, standards 10 are provided with small lateral extensions 44—44, fixed flatwise upon which and disposed transversely of the machine is a small plate 45. Pivoted upon this plate 45 to swing transversely of the machine and barrel 6, and located closely adjacent to the mouth of barrel 6, is a pair of oppositely disposed sausage-casing pinching-members or fingers 46—46' having preferably the form or shape illustrated particularly in Figs. 6 and 7. In the operation of the machine, these members 46—46' are designed to coöperate to successively transversely grip and pinch the sausage-casing therebetween and to afterward release the same, and to the end that they may simultaneously pivotally move from their open position, or from the position thereof illustrated in Fig. 6, to their closed or pinching position, or to the position thereof illustrated in Fig. 7, and afterward back from closed or pinching position to open or release position, the same are preferably provided with meshing gear-segments 47—47'.

One of the members 46—46', as, for instance, member 46, is provided with an arm or bracket 48, pivotally connected to which at one end is an approximately upright link 49. Fastened at one end to table 1 and at its other end to the free end of the link 49, is a coiled spring or the like 50 adapted to normally, through link 49, yieldingly hold or maintain the members or fingers 46—46' in separated, open, or release position, or in the position thereof illustrated in Fig. 6. Pivotally attached at one end, as at 51, upon the table 1 and pivotally connected at its other end, as at 52, to the link 49, is a lever 53 provided adjacent its end 52 with an enlargement or cam 54 having, for purposes shortly to appear, obliquely disposed side faces 55—55 and a concaved approximately arc-shaped under face 56.

Extending longitudinally of the machine parallel with main shaft 35, but journaled for rotation in suitable bearings 57 mounted upon the upper face of table 1, is a relatively short shaft 58. Fixed to the shaft 58 at its forward end, is a lateral arm 59 having a roller 60 working in a slot 61 provided longitudinally in one, or the upper, end of a vertically disposed elongated lever or rocking-bar 62 pivotally fastened or fulcrumed intermediate its ends, as at 63, to and upon one of the bearing-members 34.

Figure 3:
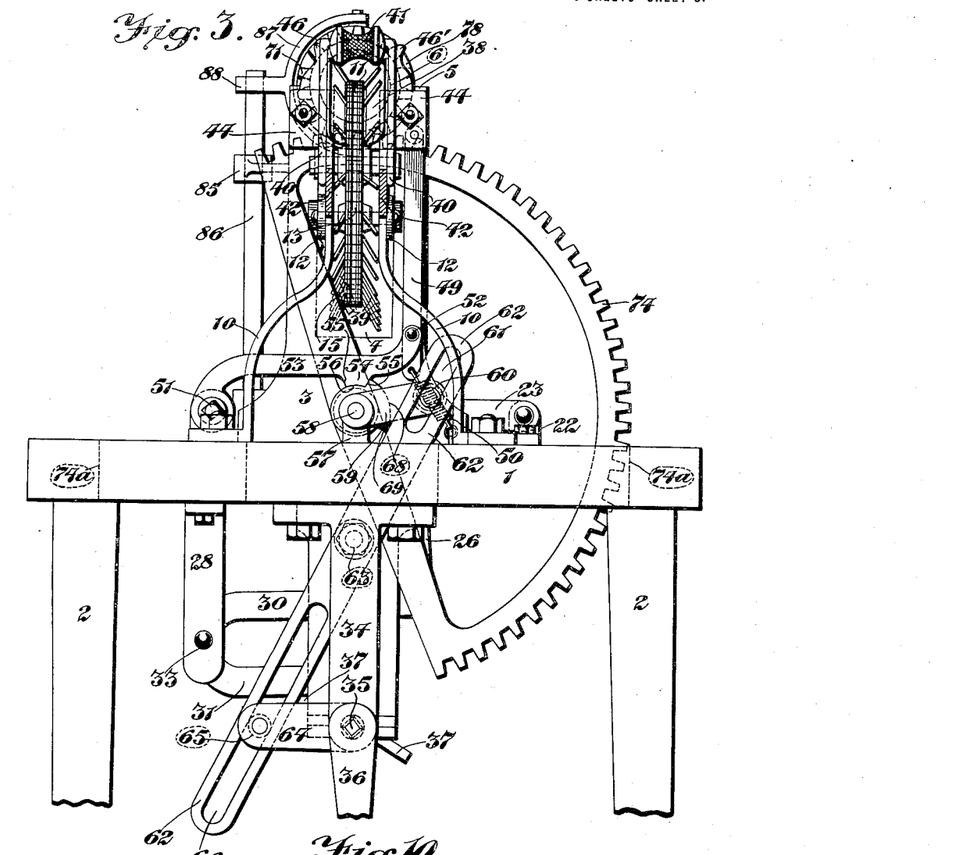
Fig. 3 is a front end elevational view of the machine.
Figures 5, 6, 7, 14:
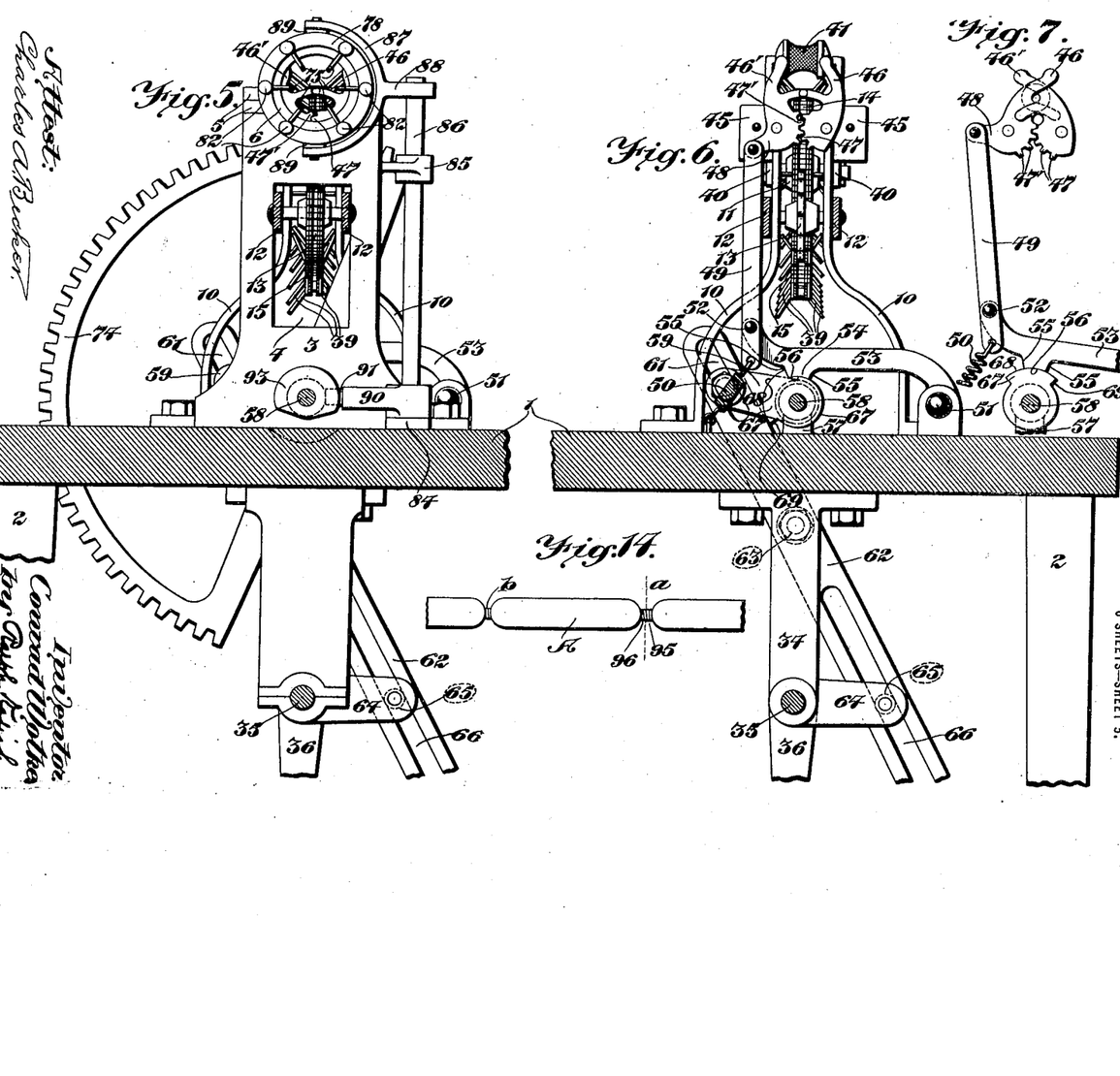
Fig. 5 is a vertical sectional view through the machine on approximately the line 5—5, Fig. 1.
Fig. 6 is a vertical sectional view through the machine on approximately the line 6—6, Fig. 1.
Fig. 7 is a fragmentary view showing the sausage-casing pinching-fingers of the machine in closed or pinching position.
Fig. 14 is a fragmentary elevational view of a sausage-casing showing both a partly formed and a completely formed link in the same.
Figure 8:
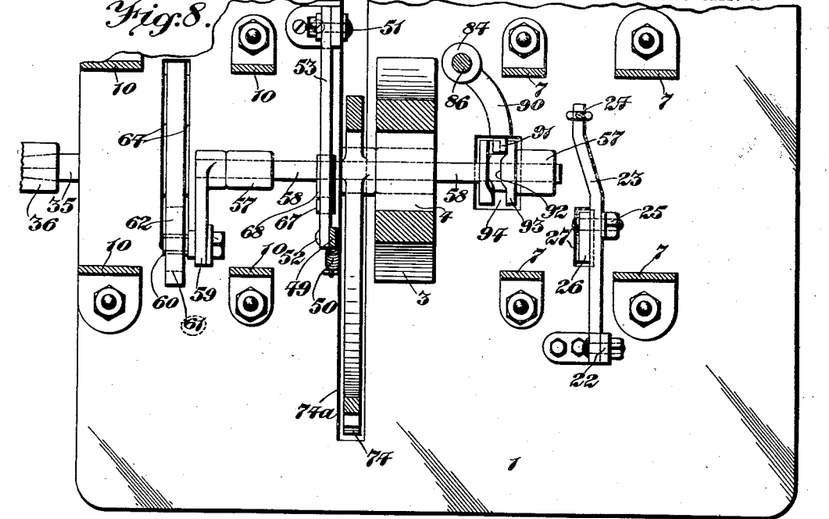
Fig. 8 is a horizontal sectional view on approximately the line 8—8, Fig. 1.
Figure 9:
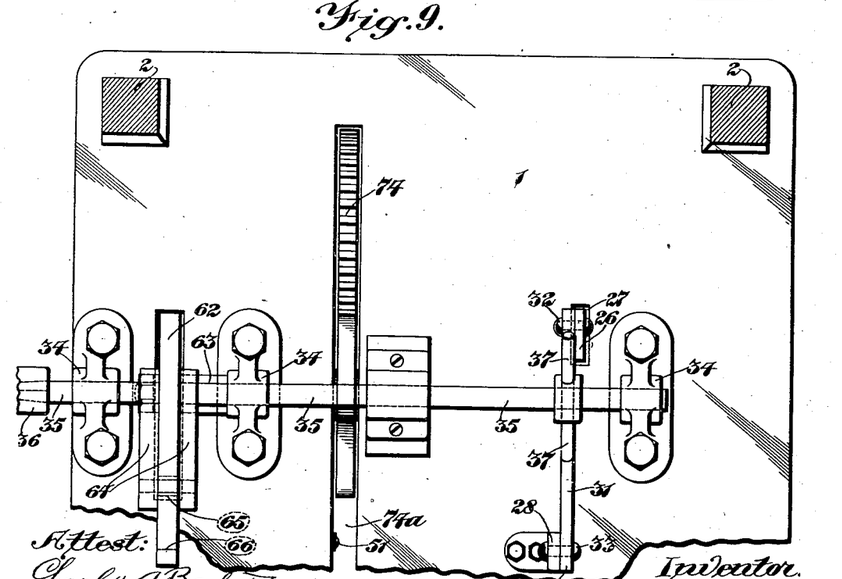
Fig. 9 is an inverted plan view of the machine and its table.

Intermediate its ends and in coöperative position relatively to the lever or bar 62, the main or actuating shaft 35 is formed with a pair of parallel spaced apart rigid lateral arms or stirrup 64 provided with a roller 65 which works in a second and somewhat elongated slot 66 provided longitudinally in the other or lower end of the rocking-bar or lever 62, as seen particularly in Figs. 3, 4, and 6. The main or actuating shaft 35 is designed and adapted to be rotarily actuated preferably clockwise always in one direction. However, through said rocking-bar or lever 62 and its described coöperating parts, it will be evident that, on the rotation of shaft 35 in one direction, the shaft 58, and the parts hereinafter mentioned fixed thereupon, will be rotarily actuated reciprocatorily, that is to say, first in one direction or clockwise and then in the reverse direction or counter-clockwise; and the several parts are here so proportioned that, on one complete rotation or axial revolution of main shaft 35, the shaft 58 and the parts carried thereby will be rotarily actuated through an arc of approximately 180° first in one direction and then reversely in the other direction.

Fixed upon the shaft 58 in coöperative position relatively to cam-portion 54 of lever 53, is a cam-member 67 having a convexed approximately arc-shaped face, as at 68, and obliquely disposed side faces, as at 69—69, for coöperation, respectively, with the faces 56 and 55 of the cam 54 of lever 53. On the described rotary reciprocations of shaft 58 through an arc in each direction of approximately 180°, the cam 67 is adapted to engage with cam 54 and thereby, through lever 53 and link 49, and against the tension of spring 50, actuate the fingers 46—46' to closed or sausage-casing pinching position, the cam 67 at its face 68 having such circumferential length in the present machine as to continue, during the rotary reciprocations of shaft 58, in engagement with the cam 54 and to thereby maintain the said fingers 46—46' in closed position during approximately four-fifths of the rotary travel of the shaft 58 in each direction, the fingers 46—46' returning at once, under the pull of spring 50, to open or release position after the cam 67 is carried in each instance out of engagement with the cam 54. Thus, on each full or complete rotary movement of the main shaft 35, the pinching-fingers 46—46', through the described parts, will be twice actuated to closed or sausage-casing pinching position and, in each instance, held or maintained in such closed position for, as stated, approximately four-fifths of each of the reciprocatory rotary movements of the shaft 58.

Figure 13:
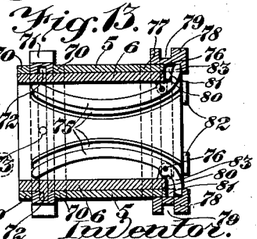
Fig. 13 is a detail sectional view through the sausage-barrel on approximately the line 13—13, Fig. 12.

Welded or otherwise fixed to and upon the periphery of, and extending around, the barrel 6 at the forward end thereof, as seen particularly in Fig. 13, is a pair of spaced collars or rings 70—70. Journaled upon the barrel 6 between the rings 70—70, is a gear-wheel 71 provided annularly upon its inner periphery with a slot 72 extending approximately through an arc of 180° or approximately half the inner circumference of the gear-wheel 71. Fixed to the barrel 6 and projecting lengthwise into the slot 72, is a small rigid pin or stud 73.

Fixed upon the shaft 58 and meshing with gear-wheel 71, is a substantially semi-circular gear-segment 74, the table 1 being provided transversely with a slot, as at 74ª to accommodate the gear-segment 74. The gear-segment 74 has, in the machine here shown, a ratio relatively to the gear-wheel 71 of approximately two and a half to one (2½ to 1), whereby, on each rotary movement of the shaft 58 and its gear-segment 74 in one direction, the gear-wheel 71 will be rotarily actuated through two and one-half complete revolutions, or, on each complete rotary reciprocation back and forth of the shaft 58 and its gear-segment 74, the gear-wheel 71 will be actuated rotarily through five complete revolutions. However, due to the slot 72, the gear-wheel 71, for approximately a half of its first revolution when rotated as described in one direction or the other, and until the pin 73 engages with one or the other end wall of the slot 72, rotates loosely on the barrel 6 and the barrel 6 consequently remains stationary; but, on the engagement of the pin 73 with one or the other end wall of the slot 72, the barrel 6 will be carried around or rotatably actuated with the gear-wheel 71. Thus, again, on each rotary movement of the shaft 58 and its gear-segment 74 in one direction, barrel 6 will be rotarily actuated, as described, through approximately two complete revolutions, or, on each complete rotary reciprocation back and forth of the shaft 58 and its gear-segment 74, the barrel 6 in the present machine will be rotarily actuated through approximately four complete revolutions.

The sausage casing, as it is worked upon, is relatively soft and more or less slimy and slippery. Consequently, to twist and thereby link the casing, the casing must be positively and firmly grasped or gripped. For this purpose, I provide in my present machine certain fingers, which, for purposes of description, I shall designate the twisting-fingers. These fingers, in my machine, when actuated to engage the sausage-casing, operate in a manner closely analogous to the action of the fingers of the human hand, the said fingers gripping the casing with a firm, positive grip, or, as it might be described, biting into the casing, but without injuring or breaking the same. Thus, in the rotation of the twisting-fingers to twist and thereby link the casing, slipping of the casing is overcome and prevented, the casing being positively carried around with the twisting-fingers and thereby twisted or linked. These twisting-fingers will now be described.

Disposed longitudinally of the barrel 6 and arranged around within the barrel 6 in an annular spaced series, are a plurality of lengthwise curved sausage-casing twisting-fingers 75. Each finger 75 is separately or individually pivoted at its rear end, as at 76, upon the inner face of the barrel 6 adjacent to the rear end thereof, each finger 75 having its free end disposed toward the forward end of the machine. Welded or otherwise fixed upon the barrel 6 at its rear end, is a bearing-ring 77, and mounted to slidably move upon this ring 77 lengthwise of the machine, is a second ring 78 provided circumferentially with an annular groove 79. At, and inwardly from, its rear end, the barrel 6 is longitudinally provided in its wall with a plurality of small slots 80, equaling in number the number of fingers 75, and the several slots 80 being in alinement with the several fingers 75, respectively. Disposed transversely upon the inner face, and extending forwardly a suitable distance from the rear rim, of movable ring 78, are a plurality of small grooves or recesses 81, there being one groove or recess 81 for, and registering with, each respective barrel-slot 80. The several grooves 81 are permanently closed at their respective rear ends in any suitable manner, as by welded metal spots or the like 82. Each finger 75 is provided with a tail-piece or extension 83 projecting into a respective registering pair of slots 80 and 81. Thus, as ring 78 is caused, by means hereinafter described, to transversely slidably move successively upon the ring 77 first forwardly and then rearwardly of the machine, the fingers 75, due to the successive engagement of their tail-pieces 83 first with the rear walls and then with the front walls of the grooves 81, will be actuated successively to closed or twisting position and then from twisting to open or release position; and, further, as and when the barrel 6 is rotarily actuated by the means hereinbefore described, the ring 78 will be rotarily moved therewith due to the engagement of the finger tail-pieces 83 with the side walls of the grooves 81. It will be evident that the fingers 75, mounted as described upon the inner face of the barrel 6, will also be carried around with the barrel 6 as and when the same is rotarily actuated.

Mounted at its lower end in a step-bearing or the like 84 fixed upon the table 1, and firmly supported adjacent its upper end by a suitable bearing 85 suitably fixed to and projecting from main standard 3, is an upright rod or staff 86. 87 indicates an approximately semi-circular or Y-shaped yoke or the like, which is disposed about the ring 78 as illustrated particularly in Fig. 5, this yoke 87 having an arm or stem 88 which is suitably fixed to and upon the upper end of staff 86. Fixed to the ends of the legs of the yoke 87 and disposed loosely within annular ring-slot 79 to engage with the side walls thereof, are members or shoes 89—89. Fixed at one end to the staff 86 and projecting therefrom somewhat laterally of the machine, is a curved arm 90 provided at its other or free end with a roller 91 workingly disposed in a curved or annularly disposed slot 92 provided circumferentially in an approximately semi-circular or segmental member 93 fixed in operative position upon the shaft 58. Continuous with, and forming substantially parts of the slot 92, are cam-ways 94—94 at the opposite ends of the slot 92, with which cam-ways the roller 91 is adapted to coöperate alternately as the shaft 58 and its conjoined member 93 alternately approach and reach the end of their rotary travel in one and the other direction to, through arm 90, staff 86, yoke 87, and its ring-engaging members or shoes 89, slidably actuate the ring 78 longitudinally, and toward the rear, of the machine, the fingers 75 being thereby, as before mentioned, actuated from closed or twisting position to open or release position.

The sausage-casings A to be linked are usually, as is well known, of some extended length, approximately 26 to 30 feet or so, and, when filled with the sausage-material, have an approximately cylindrical form, each casing A being suitably closed at its ends to contain or hold, and prevent the escape therefrom of, the meat or other sausage-material.

Now, in the use or operation of my machine, and in linking the casing A, that is to say, dividing the same into a plurality of connected sausages each of a certain approximately equal predetermined length, such a casing A is first fed or directed lengthwise upon the idler 43 and into front track-way 38. Then, shaft 35 being rotarily actuated, and it is to be noted that in the operation of the machine this shaft 35 is designed to be continuously rotarily driven, the sausage-casing A is engaged by the chain or belt 15, and then, as pawl 20 engages in turn and at predetermined intervals with the successive teeth 18 of the ratchet-wheel 17, and the chain 15 is thereby intermittently driven, as before described, for certain approximately equal predetermined distances, the casing A will correspondingly be step-by-step or intermittently advanced or carried longitudinally of the machine and lengthwise beneath first roller 41 into and through the barrel 6 and then onto and along the rear trackway 38 and beneath rear roller 41', the chain or belt 15 and its carried sausage-casing A being stationary in the machine when and during the intervals the rocker-pins 37 are out of engagement with the rockable member 29. As soon as a rocker-pin 37 is carried out of engagement with its coöperating member 29 on the continued rotation of shaft 35, and as the shaft 58 is rotarily now being actuated in one direction, simultaneously cam 67 is brought into engagement with its coöperating cam 54 and roller 91 passes from a cam-way 94 into the slot 92, whereupon, also simultaneously, the fingers 46—46' will, as before described, be actuated to closed or pinching position, said fingers then gripping the casing A at a point, as at $a$, and reducing the same in transverse area at such point $a$ of pinching, as illustrated in Fig. 7, and ring 78 will, transversely thereof, but longitudinally of the machine, be slidably moved toward the forward end of the machine and twisting-fingers 75 thereby, as before described, brought to closed position to also grip the casing A therebetween, the fingers 75 being so proportioned as to so grip the casing A at a point slightly to the rear of the point of engagement $a$ of the fingers 46—46' with the casing A. Then, as and while, on the continued rotary travel of the shaft 58 in said one direction, the cam-members 67 and 54 remain in engagement at their faces 68 and 56, and as and while the roller 91 rolls or travels in said slot 92, the fingers 46—46' and 75 will be maintained in such closed or gripping position; and as the cam-members 67 and 54 at their respective curved faces 68 and 56 and slot 92 have equal length circumferentially, the fingers 46—46' and 75 will correspondingly be maintained in such closed or gripping positions during an equal and synchronized period of time. And it may be here stated that, immediately at and during the movement of the fingers 46—46' and 75 to their said respective gripping positions, the gear-wheel 71 is being loosely rotated upon the barrel 6; as soon, however, as the said fingers 46—46' and 75 have been actuated as described to gripping position, an end wall of slot 72 engages, on the continued rotation of gear-wheel 71 and its driving-segment 74 in said one direction, with the barrel-pin 73, when the barrel 6 with its fingers 75 will be revolved with the gear-wheel 71, the fingers 75 in such movement torsionally acting upon the casing A engaged thereby to give the same a number of twists, in this instance two, upon itself, as indicated, as at 95, to the right of the dotted line appearing at $a$ in Fig. 14. Then, simultaneously, on the continued rotation of shaft 35, and as the shaft 58 approaches the end of its rotary travel in said one direction, the cam 67 will be carried out of engagement with the cam 54 and the roller 91 will be carried into one of the cam-ways 94, whereupon the fingers 46—46' and 75 will, as before described, be actuated to open position to release the casing A. The shaft 58, having now reached the end of its rotary travel in said one direction, will now, on the continued rotation of shaft 35, be rotarily reciprocated or caused to rotate in the opposite direction, whereupon, first, a rocker-arm 37 will engage with the rockable member 29 and chain 15 and its carried casing A be so advanced, as before described, a certain predetermined distance longitudinally of the machine; the said pin 37 then passing out of engagement with the member 29, chain 15 and its carried casing A become stationary, and cam 67 being now brought into engagement at its face 68 with the face 5″ of cam 54 and roller 91 passing from a cam-way 94 into the slot 92, the fingers 46—46' and 75 will be again actuated to grip the casing A, but this time or in this instance at a point, as at $b$, Fig. 14, a predetermined distance, depending upon the amount of travel given chain 15, from their first point of engagement $a$ with the casing A. The gear-wheel 71 then, having in the just before mentioned operations been rotating loosely on the barrel 6, engages at an end of its slot 72 with the pin 73, when barrel 6 with its fingers 75 will be again rotarily actuated and the casing A thereby similarly torsionally twisted at $b$. Then, and again, as the shaft 58 approaches the end of its rotary travel in this latter direction, cam 67 will be carried out of engagement with the cam 65 and roller 91 will be carried into the opposite cam-way 94 and fingers 46—46' and 75 actuated to open position to release the casing A, and so on throughout the operation of the machine; but, the casing A having been advanced as described and the point $a$ of first twisting thereupon being now located in the machine at a point intermediate the pinching-fingers 46—46' and the rear holding roller 41', the casing A, while being now twisted at $b$, will simultaneously and at its point $a$ of first twisting or reduced or weakened area be given an equal and additional number of twists as indicated, as at 96, to the left of the dotted line in Fig. 14, whereby it results that each complete link in the linked casing A will comprise as many torsional twists upon the casing A, in this instance four, as may equal the number of revolutions of the barrel 6 and its twisting-fingers 75 during one complete rotation of the main shaft 35.

Thus, as described, in and by my machine, the original sausage-casing A is first advanced, then simultaneously engaged or gripped by the fingers 46—46' and 75, then torsionally twisted by the fingers 75 at or closely adjacent to the point of engagement of the fingers 46—46' with the casing A, then released by the fingers 46—46' and 75, then again advanced a predetermined distance through the machine, then again gripped and held by the fingers 46—46' and 75, as well as also by rear roller 41', then again twisted now both at its said first point of twisting and also at a second point now at or closely adjacent to the second point of engagement of the fingers 46—46' with the casing, then again released by the fingers 46—46' and 75, then again and further advanced a similar predetermined distance, then again torsionally twisted, but now at both said second point of twisting and at a third point, and so on throughout the length of the particular casing A being worked upon, the rollers 41—41' holding the casing A from being torsionally twisted at any other points than those mentioned as it is being advanced through the machine and the several parts of my machine not only automatically, but also at the proper time, as described, performing their several respective functions.

It is to be understood that the several parts of my machine may have any suitable relative dimensions, as may be desired, to, for instance, operate upon sausage-casings of larger or smaller diameter, or to give the casings being linked a greater or less number of twists at each finished link, or to link the particular casings being worked upon into sausage-products of greater or less length, and that other changes in the form, construction, arrangement, and combination of the several parts of my machine may be made and substituted for those herein shown and described without departing from the nature and principle of my invention.

Having thus described my invention, what I claim and desire to secure by Letters Patent is:

1. In a machine of the kind described, means for intermittently at approximately equal intervals conveying the sausage-casing step-by-step approximately equal distances, said means including a plurality of pulleys, an endless conveyer traveling upon the pulleys, a ratchet-wheel fixed to one of the pulleys, a pawl yieldingly engaging the ratchet-wheel, a rotatable shaft, a pair of oppositely disposed pins fixed on said shaft, a rockable member, a lever fulcrumed at one end, a link connecting the free end of the lever with the pawl, and a second link connecting the lever with the rockable member, and means for torsionally twisting the sausage-casing during the stationary intervals of said conveying-means.

2. A machine of the kind described including a pair of coöperating pivoted pinching-fingers adapted to releasably grip a sausage-casing therebetween and being normally yieldingly in open or release position, said fingers being provided with extensions engaging one with the other so that the fingers will pivotally move oppositely in unison, and means for pivotally actuating the fingers to closed or gripping position.

3. A machine of the kind described including a pair of coöperating pivoted pinching-fingers having meshing gear-segments, said fingers being adapted to releasably grip a sausage-casing therebetween and being normally yieldingly in open or release position, and means including a member having engagement with one of the fingers for pivotally actuating the fingers to gripping position.

4. A machine of the kind described including a pair of pivoted fingers adapted to releasably grip therebetween a sausage-casing or the like, said fingers being normally yieldingly in open or release position, and means for pivotally actuating the fingers to gripping position, said means including meshing-gear-segments on said fingers, a rockable lever, a link connecting the lever with one of the fingers, and coöperating members for rocking the lever.

5. A machine of the kind described including a pair of pivoted fingers adapted to releasably grip therebetween a sausage-casing or the like, said fingers being normally yieldingly in open or release position, and means for pivotally actuating the fingers to gripping position and for maintaining the fingers in such gripping position for a predetermined period, said means including meshing gear-segments on the fingers, a rockable lever, a link connecting the lever to one of the fingers, a rotatable shaft, and coöperating cam-members on the lever and shaft, the cam-members having matching arc-shaped faces of predetermined circumferential length.

6. In a machine of the kind described, an annular series of fingers disposed lengthwise relatively to one another and longitudinally relatively to the travel of the sausage-casing, said fingers being adapted to releasably grip the sausage-casing therebetween to torsionally twist the same, means having engagement with all the fingers for positively actuating the same alternately to grip and release the sausage-casing, means for feeding the sausage-casing to the fingers when the same are in release position, and means for rotarily actuating the series of fingers.

7. In a machine of the kind described, a rotatable member, an annular series of fingers pivotally mounted within said member and disposed lengthwise relatively to one another and longitudinally relatively to the travel of the sausage-casing, said fingers being adapted to releasably grip the sausage-casing therebetween to torsionally twist the same, means having engagement with all the fingers for positively actuating the same alternately to grip and release the sausage-casing, means for feeding the sausage-casing to the fingers when the same are in release position, and means for rotarily actuating said member with its said fingers.

8. A machine of the kind described including a plurality of fingers adapted to releasably grip a sausage-casing therebetween for torsionally twisting the same, said fingers being disposed lengthwise relatively to one another in an annular series, and means including a member engaging with all the fingers for positively actuating the series of fingers successively to grip and release the sausage-casing.

9. In a machine of the kind described, a barrel, a plurality of fingers pivotally mounted and disposed in an annular series within the barrel, said fingers being adapted to releasably grip a sausage-casing therebetween, and means for positively actuating the series of fingers successively to grip and release the sausage-casing, said means including a member slidable upon the barrel and engaging with all the fingers.

10. A machine of the kind described including a barrel, a plurality of fingers pivotally mounted and disposed in an annular series within the barrel, said fingers being adapted to releasably grip a sausage-casing or the like therebetween, and means for pivotally actuating the fingers to grip and release the sausage-casing or the like, said means including a ring slidable upon the barrel and provided upon its inner periphery with a plurality of transverse grooves, tail-pieces on the fingers disposed within said grooves to engage the end walls thereof, and coöperating means for slidably actuating the ring relatively to the barrel.

11. A machine of the kind described including a barrel, a plurality of fingers pivotally mounted and disposed in an annular series within the barrel, said fingers being adapted to releasably grip a sausage-casing or the like therebetween, and means for pivotally actuating the fingers to grip and release the sausage-casing or the like, said means including a ring slidable upon the barrel and provided upon its inner periphery with a plurality of transverse grooves, said ring being also provided annularly with a circumferential slot, a pivoted staff, a yoke fixed on the staff and disposed around said ring, members on the yoke disposed within said slot to engage the walls thereof, an arm projecting from the staff, a rotatable member having an annularly disposed camway, and a roller on said arm working in said camway.

12. In a machine of the kind described, a pivoted series of lengthwise convexedly curved twisting-fingers, and means for pivotally actuating the fingers to grip and release a sausage-casing, said fingers when actuated to gripping position engaging the sausage-casing at their convex-surface.

13. In a machine of the kind described, a rotatable series of pivoted lengthwise convexedly curved twisting-fingers, means for pivotally actuating the fingers to grip and release a sausage-casing, said fingers when actuated to gripping position engaging the sausage-casing at their convex-surface, and means for rotating the series of fingers when the same are in gripping position.

14. In a machine of the kind described, a rotatable barrel, a plurality of fingers pivotally mounted and disposed in an annular series within the barrel, said fingers being lengthwise convexedly curved, means for pivotally actuating the fingers to grip and release a sausage-casing, said fingers when actuated to gripping position engaging the sausage-casing at their convex-surface, and means for rotarily actuating the barrel with its said fingers when the fingers are in gripping position.

15. A machine of the kind described including a rotatable barrel, twisting-members mounted within the barrel to rotate therewith, and means for rotarily actuating the barrel with its said members, the barrel and its said members being stationary through a portion of an operation of said rotating-means.

16. A machine of the kind described including a rotatable barrel, twisting-members mounted within the barrel to rotate therewith, a gear-wheel loosely mounted on the barrel, a driving-gear meshing with said gear-wheel, and means for causing the barrel and its said members to rotate with said gear-wheel after the same has completed a portion of a revolution in one direction, the barrel and its said members being stationary during such portion of the rotary travel of the gear-wheel.

17. A machine of the kind described including a rotatable barrel, twisting-members mounted within the barrel to rotate therewith, a gear-wheel loosely mounted on the barrel, said gear-wheel being provided upon its inner periphery with an annularly disposed slot, a driving-gear meshing with said gear-wheel, and a rigid pin on the barrel projecting into said slot and adapted to engage with an end wall of the slot to cause the barrel with its said members to rotate with the gear-wheel after the gear-wheel has completed a portion of a revolution in one direction equal approximately to the circumferential length of the slot, the barrel with its said members being stationary during such portion of the rotary travel of said gear-wheel.

18. A machine of the kind described including a rotatable barrel, a plurality of twisting-fingers mounted to rotate with the barrel, said fingers being arranged lengthwise around within the barrel in an annular series, means for reciprocatorily rotating the barrel with its said fingers, and means for actuating the fingers alternately to gripping and release position, the fingers being in gripping position during the rotation of the barrel in either direction.

19. A machine of the kind described including a rotatable barrel, a plurality of twisting-fingers mounted to rotate with the barrel, said fingers being arranged lengthwise around within the barrel in an annular series, means for reciprocatorily rotating the barrel with its said fingers, said means including a rotatable shaft rotarily movable always in the same direction, and means for actuating the fingers alternately to gripping and release position, the fingers being in gripping position during the rotation of the barrel in either direction.

20. A machine of the kind described including a rotatable barrel, twisting-members mounted within the barrel to rotate therewith, and means for reciprocatorily rotating the barrel with its said members, said means including a gear-wheel mounted upon and engaging with the barrel, a rotarily movable shaft, a gear on said shaft meshing with said gear-wheel, a second shaft rotatable always in the same direction, and connecting members between said shafts for causing said first shaft to rotarily move in reverse directions on the rotation in one direction of said second shaft.

21. A machine of the kind described including a rotatable barrel, twisting-members mounted within the barrel to rotate therewith, a rotatable shaft rotarily movable always in the same direction, and means for causing said barrel with its said members to rotatably move in reverse directions on the rotation in one direction of said shaft, said means including a gear-wheel mounted upon and engaging with the barrel, a second rotarily movable shaft, a gear on said second shaft meshing with said gear-wheel, a lever-bar fulcrumed intermediate its ends, said lever-bar being provided longitudinally at each end with a slot, lateral crank-arms on each of said shafts, and rollers on said crank-arms working in the respective slots of said lever-bar.

22. A machine of the kind described comprising, in combination, means for lengthwise feeding a sausage-casing, means for holding the casing from torsional twisting at two spaced apart points, an annular series of fingers adapted to grip the casing for torsionally twisting the same intermediate said points of holding, and means for reciprocatorily rotating the series of fingers, the fingers being in casing-gripping position during their rotation in either direction.

23. A machine of the kind described comprising, in combination, means for lengthwise intermittently feeding a sausage-casing, means for holding the casing from torsional twisting at two spaced apart points, an annular series of fingers, and means for reciprocatorily rotating the series of fingers, the fingers being adapted, during their rotation in either direction, to grip the casing for torsionally twisting the same intermediate said points of holding, the casing being thereby given a predetermined number of twists at a certain point during the rotation of the fingers in one direction and a further and equal number of twists at said certain point during the rotation of the fingers in the opposite direction.

24. A machine of the kind described comprising, in combination, a pair of pinching-fingers adapted to releasably grip a sausage-casing to reduce its normal cross-sectional area, means for actuating said fingers to grip and release the sausage-casing, an annular series of twisting-fingers disposed lengthwise relatively to one another and longitudinally relatively to the travel of the sausage-casing, said fingers being adapted to releasably grip the sausage-casing therebetween to torsionally twist the same at said point of reduced area, means for positively actuating the fingers to alternately grip and release the sausage-casing, means for actuating the twisting-fingers to torsionally twist the casing, and means for feeding the sausage-casing to said fingers when the same are in release position.

25. A machine of the kind described comprising, in combination, a pair of pivoted pinching-fingers adapted to releasably grip a sausage-casing to reduce its normal cross-sectional area, means for pivotally actuating said fingers to grip and release the sausage-casing, a rotatable member, an annular series of twisting-fingers pivotally mounted within, and rotatable with, said member, said fingers being adapted to releasably grip the sausage-casing therebetween to torsionally twist the same at said point of reduced area, means for positively actuating the fingers pivotally to alternately grip and release the sausage-casing, means for rotarily actuating said member and its series of fingers to torsionally twist the casing, and means for feeding the sausage-casing to said pinching and twisting fingers when the same are in release position.

26. A machine of the kind described comprising, in combination, means for lengthwise feeding a sausage-casing, means for holding the casing from torsional twisting at two spaced apart points, an annular series of twisting-fingers adapted to releasably grip the casing for torsionally twisting the same intermediate said points of holding, and means having engagement with the fingers for positively actuating the same alternately to grip and release the sausage-casing.

27. A machine of the kind described comprising, in combination, means for lengthwise feeding a sausage-casing, rollers engaging the fed casing for holding the same from torsional twisting at two spaced apart points, an annular series of pivoted twisting-fingers adapted to releasably grip the casing for torsionally twisting the same intermediate said points of holding, and means having engagement with the fingers for positively actuating the same pivotally to alternately grip and release the sausage-casing.

In testimony whereof, I have signed my name to this specification.

CONRAD WOLKE.